United States Patent
Coleman et al.

(10) Patent No.: US 9,286,716 B2
(45) Date of Patent: Mar. 15, 2016

(54) 3D GRAPHICS UI AFFORDANCES BASED ON BEHIND-THE-SCENES SIMULATION

(71) Applicant: Pixar, Emeryville, CA (US)

(72) Inventors: Patrick Coleman, Oakland, CA (US); Igor Mordatch, Toronto (CA)

(73) Assignee: PIXAR, Emeryville, CA (US)

( * ) Notice: Subject to any disclaimer, the term of this patent is extended or adjusted under 35 U.S.C. 154(b) by 302 days.

(21) Appl. No.: 13/928,274

(22) Filed: Jun. 26, 2013

(65) Prior Publication Data

US 2014/0002454 A1    Jan. 2, 2014

Related U.S. Application Data

(60) Provisional application No. 61/665,148, filed on Jun. 27, 2012, provisional application No. 61/800,573, filed on Mar. 15, 2013.

(51) Int. Cl.
*G09G 5/00* (2006.01)
*G06T 17/00* (2006.01)
*G06T 13/20* (2011.01)

(52) U.S. Cl.
CPC ............... *G06T 17/00* (2013.01); *G06T 13/20* (2013.01); *G06T 2210/56* (2013.01)

(58) Field of Classification Search
CPC . G06F 17/5009; G06T 13/20; G06T 2210/16; G06T 2210/24; G01V 99/005
See application file for complete search history.

(56) References Cited

U.S. PATENT DOCUMENTS 8,531,463 B2 *   9/2013   Favier et al. .................. 345/473

OTHER PUBLICATIONS

"EDEM 2.1 User Guide", DEMSolutions, revision 3E, 2008 DEM SOlutions, pp. 1-138.*

* cited by examiner

*Primary Examiner* — Jacinta M Crawford
*Assistant Examiner* — Robert Craddock
(74) *Attorney, Agent, or Firm* — Patterson & Sheridan, LLP

(57) ABSTRACT

A static model is populated with graphics objects by identifying a first graphics object that is associated with the static model, creating a first plurality of graphics objects where each graphics object in the first plurality of graphics objects comprises an instance of the first graphics object, placing each graphics object in the first plurality of graphics objects into a respective first position, and simulating a motion path for each graphics object in the first plurality of graphics objects from their respective first position to a respective second position.

20 Claims, 16 Drawing Sheets

3D GRAPHICS UI AFFORDANCES BASED ON BEHIND-THE-SCENES SIMULATION

CROSS-REFERENCE TO RELATED APPLICATIONS

This application claims the priority benefit of United States provisional patent application entitled "3D GRAPHICS UI AFFORDANCES BASED ON BEHIND-THE-SCENES SIMULATION," Ser. No. 61/665,148, filed Jun. 27, 2012 and United States provisional patent application entitled "3D GRAPHICS UI AFFORDANCES BASED ON BEHIND-THE-SCENES SIMULATION," Ser. No. 61/800,573, filed Mar. 15, 2013. Each of the aforementioned related patent applications is herein incorporated by reference in its entirety.

BACKGROUND OF THE INVENTION

1. Field of the Invention

The present invention relates to the field of computer animation and, in particular, to 3D graphics user interface (UI) affordances based on behind-the-scenes simulation.

2. Description of the Related Art

Computer-based animation often involves scenes that include both static and dynamic objects. Main characters and movable objects are modeled as dynamic objects. Items that do not move in the scene, such as set elements, are modeled as static objects. Typically, the animator places such static objects manually, and the static objects remain in place during the simulation of the animated scene. In some cases, placing such static objects involves building a complex geometric model with a large number of individual elements. For example, an animator could place a large number of leaves or debris on a floor or grassy area, where the leaves remain in place during the animated scene. To improve aesthetic quality, the individual elements should be placed in such a manner that the elements have believable geometric contact. In the example, the animator would place leaves such that, when the leaves settle into place, the leaves rest against the floor or ground and against each other, such that the leaves would look visibly correct. That is, the leaves should not intersect or pass through each other.

One possible approach for achieving the desired visual aesthetic is for the animator to manually place each object in the scene. For example, the animator could place each leaf, one at a time, until all leaves are placed in the scene. One drawback to this approach is that the time to place all the elements is labor-intensive, particularly in a scene with hundreds or thousands of elements to place. As a result, production time and cost increase with the complexity of the static objects within each scene. Alternatively, the animator may choose to place fewer objects in each scene, reducing the artistic freedom to produce the desired look for various computer-generated set designs.

SUMMARY OF THE INVENTION

One embodiment of the present invention sets forth a method for populating a static model with graphics objects. The method includes identifying a graphics object that is associated with the static model, and creating a set of graphics objects where each of the graphics object is an instance of the first graphics object. The method further includes placing each graphics object in the set of graphics objects into a respective first position, and simulating a motion path for each graphics object in the set of graphics objects from their respective first position to a respective second position.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
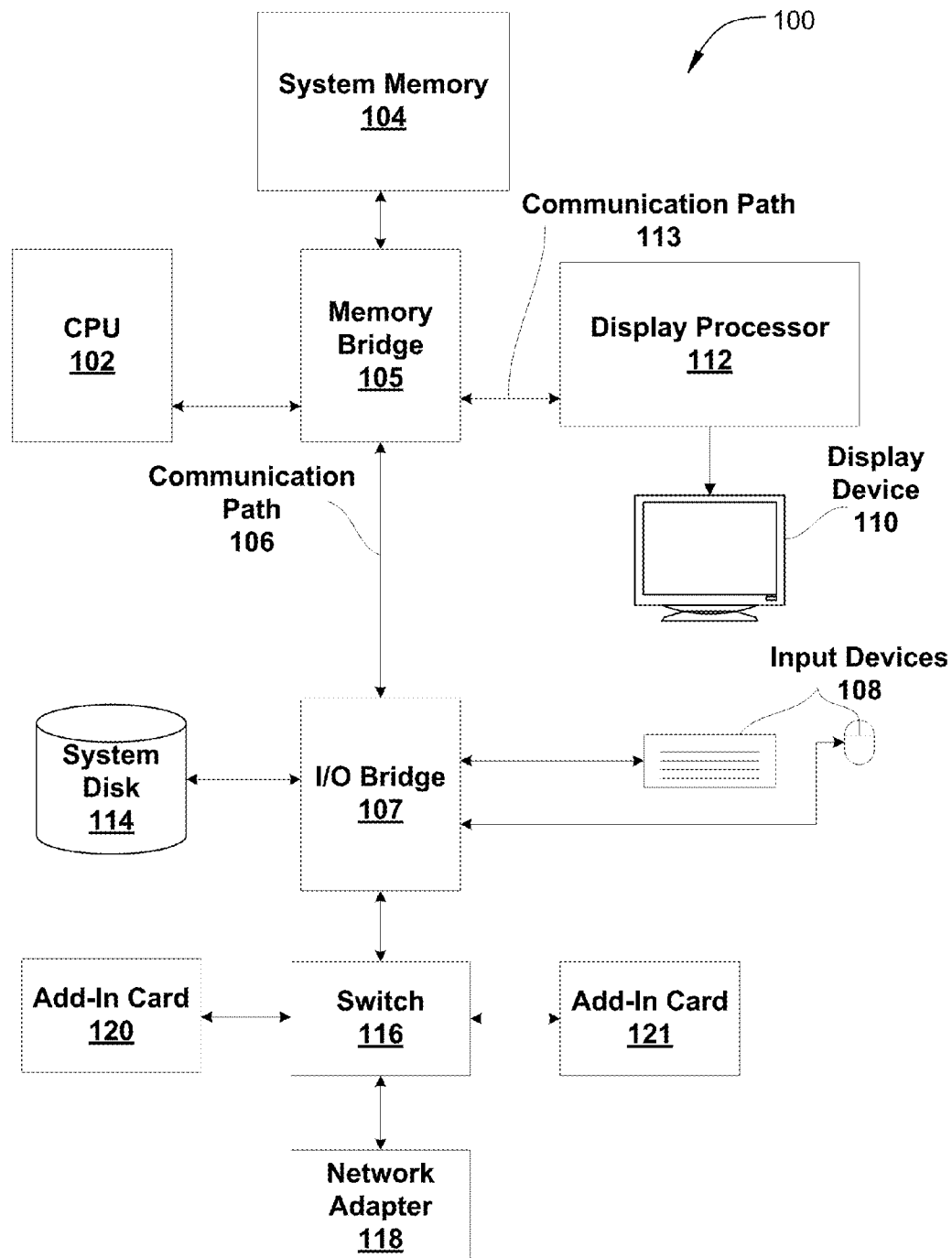
FIG. 1 is a block diagram of a system configured to implement one or more aspects of the invention.

Embodiments of the invention involve techniques for 3D graphics user interface (UI) affordances based on behind-the-scenes simulation. As used herein, the term "affordances"

refers to the quality of a computer-based workflow, graphical user interface, or other object that allows a user to perform a given action.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In some embodiments, a software application may be utilized to procedurally create complex static models, such as props, that are made up of many smaller objects. In particular, some models may need accurate contact relationships among these smaller objects. To allow for high-level art direction while automating the specific placement of objects, a multi-pass (e.g., two-pass) approach is employed when creating such complex static models. First, a user specifies approximate regions where smaller objects should be, and these regions are stochastically sampled to create an initial distribution of objects. These regions include volumes in space for creating piles and heaps, as well as small regions above existing geometry, such as sets, for scattering debris. After the objects are initially placed in space, a rigid body simulation may be executed using an appropriate simulation tool to determine final resting positions, resulting in accurate contact calculations among the objects. Because the simulation data that leads to the rest positions is not preserved, such a simulation tool is tuned to use large time steps with lower frame-to-frame movement quality, and energy correction is applied to retain overall simulation stability. As a result, the simulation completes with shorter turnaround times.

In some embodiments, the multi-pass approach described above is employed when creating complex static models that include articulated models such as chains, as well as rope-like deformable models. Such articulated models are simulated as articulated rigid body systems, while deformable objects are mapped to simulation results using a torsion-minimizing curve-based deformation. In addition, a user may create articulation constraints and spring forces that bind the stochastically distributed objects to the environment to guide the simulation. Such a hybrid approach allows a user to quickly iterate to produce heaps and scattered distributions of objects to create complex models.

In one embodiment, such a software application may include combining sampling and simulation to provide high level art direction with simulated refinement. In another embodiment, the software application includes procedural generation of simulation rigs based on both object geometry and scene sampling locations. In yet another embodiment, the software application includes using energy correction to tune a simulator for fast turnarounds, with low quality motion but high quality contact.

In one embodiment, motion of a complex static model is simulated with an emphasis on visually producing a final resting state, with lesser emphasis on modeling motion accurately. As a result, computational complexity, and therefore rendering time, is reduced.

One embodiment sets forth a method for using finite difference approximations of frame rotation differentials to create a collapse-free twist-minimizing curve-based deformation. The method includes sampling both the source curve and destination curve based on arc length, and computing incremental frame rotations on the source curve as the quaternion rotation that aligns tangents at these samples. Such incremental frame rotations on the source curve may be denoted as $qs_1$, $qs_2$, ... $qs_i$, where 'i' is the quantity of incremental frame rotations on the source curve. The method further includes computing incremental frame rotations on the destination curve as the quaternion rotation that aligns tangents at these samples. Such incremental frame rotations on the destination curve may be denoted as $qd_1$, $qd_2$, ... $qd_j$, where 'j' is the quantity of incremental frame rotations on the destination curve. The method further includes embedding each pre-deformation surface point p into the nearest rotation frame. The method further includes defining the deformation of each surface point as the translation of the embedding point on the curve plus the rotation $qs_iT^* \ldots *qs_2T^*qs_1T^*qa^*qd_1^*qd_2^* \ldots qd_j$, where qT denotes the conjugate of a unit length quaternion, and qa is a rotation that determines a frame correspondence at some point on the curve. In one embodiment, the selected point on the curve may be one endpoint of the curve. The deformation of each surface point may be computed or may be partially specified by a user.

Hardware Overview

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

A set of procedural tools, as executed on the system of FIG. 1, aids users in the creation of complex static models, such as props for a computer generated sets, where the props include many smaller complex objects, that may be combined while retaining accurate contacts among them. Users create such complex static modes via a hybrid system that geometrically samples the environment based on user specifications regarding the quantity of objects to be placed, resulting on sample locations for each of the samples. Given these sample locations, the objects are then physically simulated to place them into believable resting positions. To achieve the goal of allowing users to quickly create these complex static models, the simulation uses short simulations with relatively long time steps, resulting in fast user iteration times. Although long time steps are used, accurate contacts in the final state are achieved. In addition, the techniques described herein scale well to a large quantity of complex objects.

Figure 2:
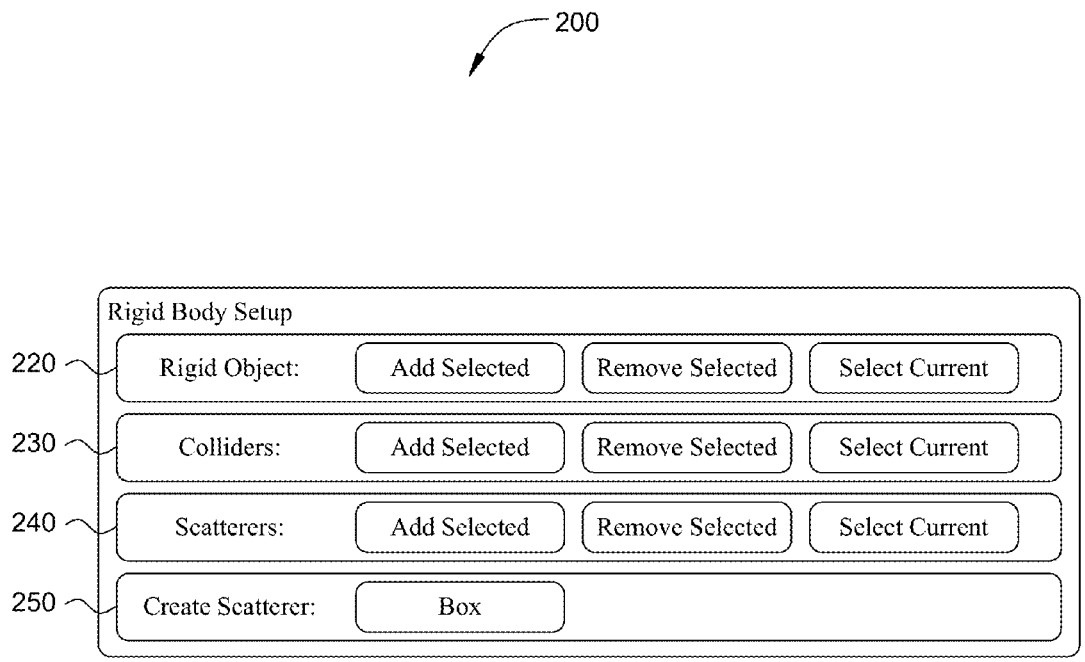
FIG. 2 illustrates a graphical user interface for configuring a collection of rigid bodies, according to one embodiment of the invention.

FIG. 2 illustrates a graphical user interface 200 for configuring a collection of rigid bodies, according to one embodiment of the invention. As shown, the graphical user interface 200 includes a rigid object window 220, a collider window 230, a scatterer window 240, and a create scatterer window 250.

The rigid object window 220 includes button controls for selecting a current rigid object for editing and for adding and removing the selected rigid object from the simulation. The rigid objects may be previously created and stored in an object library. The selected rigid bodies are not simulated. Rather, the selected rigid bodies are representative objects that are replicated to produce instances, and the instances are then simulated. The rigid bodies are basic bodies typically composed of a single non-bendable objects.

The collider window 230 includes button controls for selecting a current collider for editing and for adding and removing the selected collider from the simulation. The colliders may be previously created and stored in an object library. The colliders are not simulated. Rather, the colliders provide geometry that impedes the motion of the instances when the instances are simulated. For example, a collider could describe a planar surface representing a floor, where the instances are placed above the floor, and then "dropped" onto the floor using the simulator to model the motion of the instances when the instances are dropped.

The scatterer window 240 includes button controls for selecting a current scatterer for editing and for adding and removing the selected scatterer from the simulation. The scatterers may be previously created and stored in an object library. The scatterers are not simulated. Rather, the scatterers provide geometry used to scatter the instances in the scene. Scatterers can be volume boxes or surfaces. In some embodiments, the scatterers may represent volume boxes, where the instances of the rigid bodies may populate and fill the volume in space. In some embodiments, the scatterers may represent surfaces, where the instances of the rigid bodies may populate and fill the area just above the geometry defining the scatterer.

The create scatterer window 250 includes a control to create a new scatterer in the form of a defined geometric shape. As shown, the create scatterer window 250 shows that a 3D box is created as a scatterer. The created scatterer could be in various alternative forms, including, without limitation, a sphere, a cylindrical rod, an open cylinder representing a bucket, or a funnel. Instances populate the volume defined by the scatterer and then are dropped via the simulator. The various forms of the surface may be chosen to approximate certain effects, such as dropping instances uniformly around a set, dropping objects from a bucket-shaped objects, or dropping objects through a funnel to create a heap of objects.

Figure 3:
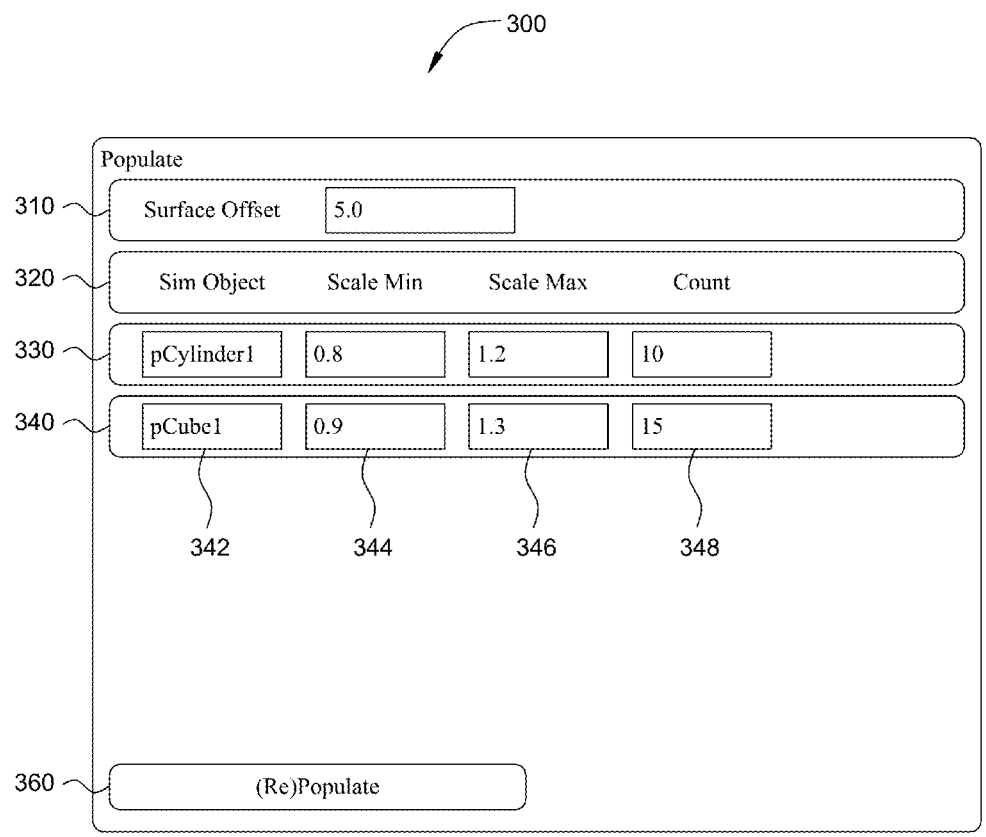
FIG. 3 illustrates a graphical user interface for populating a computer generated volume with a collection of bodies, according to one embodiment of the invention.

FIG. 3 illustrates a graphical user interface 300 for populating a computer generated volume with a collection of bodies, according to one embodiment of the invention. As shown, the graphical user interface 300 includes a surface offset window 310, a title window 320, a pCylinder1 definition window 330, a pCube1 definition window 340, and a (re) populate button 360. The graphical user interface 300 aids in the generation of a number of instances of the rigid bodies prior to simulation.

The surface offset window 310 includes a field indicating the average vertical distance of the instances relative to the selected scatterer. Two types of scatterers may be defined, identified herein as a volume scatterer and an offset scatterer. After creating one or more scatterers, each scatterer may be manually positioned, scaled, and oriented.

A volume scatterer is used to pile objects into heaps or to fill containers. If the surface offset window 310 indicates an offset of zero, then the selected scatterer is a volume scatterer. With volume scatterers, one or more scatterers are selected, where each scatterer is a three-dimensional (3D) volume, such as a cubes or a sphere, with associated affine transformations. During a populate or repopulate operation, the volume of each scatterer is stochastically sampled to determine positions for the instances within the volume. The size variation of the instances, relative counts of the various object types, and orientation of the instances are user-selectable.

An offset scatterer is used to scatter objects over a wider area. If the surface offset window 310 indicates an offset that is non-zero, then the selected scatterer is an offset scatterer, with an average offset value as specified. With offset scatterers, a two-dimensional (2D) surface of a ground plane is sampled, and then each sample is projected to a position that is a distance (vertical offset) above the height of any collision objects. This vertical offset may be set to a relatively small value to allow for fast simulation times, but large enough to provide the clearance necessary to avoid initial geometric interpenetration among the instances. As shown in the graphical user interface 300, an offset scatterer is indicated, where the surface offset specifies that the instances of the selected rigid body are placed an average 5 units above the selected scatterer.

Collision geometry identified as colliders may also be specified to model complex processes that scatter objects, where the colliders may be stationary or keyframe animated. Colliders may be used to model realistic interactions between instances and geometric objects to scatter the instances, such as modeling objects poured from a bucket or through a funnel. In general, the rigid bodies and the colliders are closed surfaces that have at least some volume.

The title window 320 indicates the header titles corresponding to the specific rigid bodies shown in the pCylinder1 definition window 330 and the pCube1 definition window 340. As shown, the title window 320 includes header titles for the rigid body to be simulated (sim object), the minimum scale value of the instances (scale min), the maximum scale value of the instances (scale max), and a quantity of the instances created from the rigid body (count).

The pCylinder1 definition window 330 includes fields to edit the population criteria for the first rigid body, a cylindrical object identified in the sim object field 342 as pCylinder1. As shown, pCylinder1 has a scale min 344 of 0.8 and a scale max 346 of 1.2, indicating that the populated instances of pCylinder1 range from 0.8 to 1.2 times the size of the original pCylinder1. In addition, pCylinder1 has a count 348 of 10 indicating that ten instances of pCylinder1 populate the selected scatterer.

The pCube1 definition window 340 includes fields to edit the population criteria for the second rigid body, a cubical object identified in the sim object field 342 as pCube1. As shown, pCube1 has a scale min 344 of 0.9 and a scale max 346 of 1.3, indicating that the populated instances of pCube1 range from 0.9 to 1.3 times the size of the original pCube1. In addition, pCube1 has a count 348 of 15 indicating that fifteen instances of pCube1 populate the selected scatterer.

The (re)populate button 360 initiates a populate function when pressed. Pressing the (re)populate button 360 a first time populates the selected scatterer with the objects as specified in the populate window shown in graphical user interface 300. Pressing the (re)populate button 360 additional times clears the scatterer of the current objects and repopulates the selected scatterer with the objects as specified in the populate window shown in graphical user interface 300. Because the populate function uses statistical sampling to populate the scatterer, the placement of the objects are slightly different each time the (re)populate button 360 is pressed. In some embodiments, instances may be manually adjusted to alter the position and rotation of individual instances. If two instances overlap slightly, then the simulator may be able to adjust the instances automatically so as the instances do not interfere with each other. If two instances have significant overlap, then the position of one or both instances may be manually adjusted to reduce or eliminate the overlap prior to simulation.

Once scatterers and colliders are specified, and the set is populated with instances of rigid bodies in a first position, a simulation is executed to simulate the motion of the objects due to gravity as the objects are dropped from a first position to a resting second position.

Figure 4:
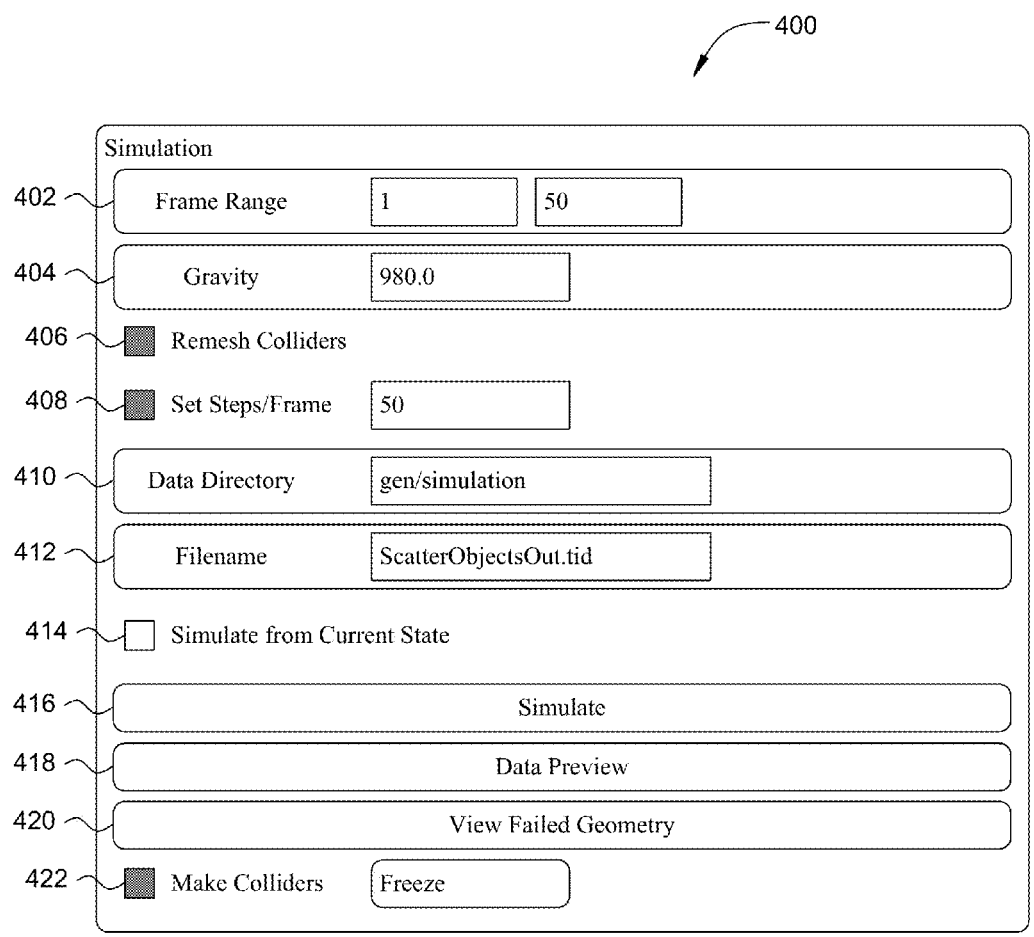
FIG. 4 illustrates a graphical user interface for simulating a collection of bodies within a computer generated volume, according to one embodiment of the invention.

FIG. 4 illustrates a graphical user interface 400 for simulating a collection of bodies within a computer generated volume, according to one embodiment of the invention. As shown, the graphical user interface 400 includes various windows, checkboxes, and buttons associated with setting up a simulation for a collection of objects.

Because the instances are dressing a set, only the final position of the instances appears in the final scene. Accordingly, fast simulation times with large time steps is favored over motion accuracy. Accurate resting contact is thereby achieved with fast simulation times. The motion that leads the instances from the initial position to the resting position is not preserved. In one approach, efficient collision detection is achieved while preserving accurate contact as the instances are stacked. To reduce the overall simulation time, in some embodiments, short simulations, such as 60-frame simulations, are performed with high gravitational acceleration, and a larger time step, such as one step per frame. An energy correction approach may be used to avoid instabilities that may result when using large time steps. With this approach, energy correction preserves momentum, even with large time steps and high gravitational acceleration, but motion may not always be resolved to a high degree of accuracy. However, robust contact relationships are maintained, leading to an accurate final resting position. Such an approach is acceptable, because only the final resting position is important for set dressing applications.

The frame range window 402 includes fields for setting the first frame and the last frame for the simulation. As shown, the frame range window 402 specifies that the simulation executes from frame number 1 through frame number 50 of a corresponding image sequence.

The gravity window 404 includes a field for setting the effective pull of gravity on the instances during the simulation. The gravity setting may be in any suitable unit measure, such as meters/second$^2$. The gravity setting may be increased, resulting in faster motion of the instances due to gravitational pull or decreased, resulting in slower motion of the instances due to gravitational pull. Increasing the gravity setting may result in fewer frames needed during the simulation for the instances to reach a resting position. As shown, the gravity is set to 980.0.

The remesh colliders checkbox 406 provides an option to generate a new wire mesh for colliders prior to executing the simulation. Typically, the surface of 3D graphics objects are modeled as a mesh of geometric primitives, such as triangles, which connect together to form the surface of the 3D object. In some cases, the triangle mesh associated with a particular graphics objects may be ill-formed, such as when some triangles are very thin, or when small gaps appear between certain adjacent triangles in the mesh. If a simulation is executed with a collider that has such an ill-formed mesh, then contact between the instances and the collider may not be modeled correctly. By pressing the remesh colliders button, a new well-formed mesh is generated for each of the colliders, and then the simulation is executed.

The set steps/frame checkbox 408 provides an option to manually or automatically set the quantity of simulation steps performed for each image frame, as specified by the frame range window 402. If the set steps/frame checkbox 408 is checked, then the number of steps per frame is manually determined by the value in the associated field. Higher values improve simulation quality and increase simulation execution time. Lower values decrease simulation execution time while reducing simulation quality. As shown, the set steps/frame checkbox 408 is set for manually setting the simulation to 50 steps/frame. If the set steps/frame checkbox 408 is not checked, then the number of steps per frame is automatically determined by the simulation at execution time. In such cases, the simulator may perform a more accurate simulation using adaptive time stepping without energy correction, with a corresponding increase in simulation execution time.

The data directory window 410 includes a field to specify a directory to store the simulation results, including the final position of the instances simulated by the simulator. As shown, the simulation results are stored in a directory called gen/simulation.

The filename window 412 includes a field to specify a filename to store the simulation results, including the final position of the instances simulated by the simulator. As shown, the simulation results are stored in a file called ScatterObjectsOut.tid.

The simulate from current state checkbox 414 provides an option to simulate from the current frame. If the simulate from current state checkbox 414 is checked, then the simulation executes from the current frame. If the simulate from current state checkbox 414 is not checked, then the simulation executes from the frame specified in the frame range window 402.

The simulate button 416 initiates the execution of the simulation when pressed. Colliders and objects are remeshed according to associated settings, as described herein, and the simulation proceeds. In some embodiments, the image frames generated by the simulation may be viewed as the frames are created. The user may halt the simulation at any point where the instances are in a desired position. Once the simulation is halted, the user may scrub back and forth to select a desire image frame for export.

The data preview button 418 enables data visualization of the simulation frames when pressed. If the data preview button 418 is pressed, then each image frame is viewable by the user as each image frame is generated. If the data preview button 418 is not pressed, then image frames are not viewable by the user. In the latter case, the simulation may execute faster.

The view failed geometry button 420, when pressed, causes geometry that the simulator could not process to be highlighted. Failed geometry includes, without limitation, inverted surfaces, unclosed surfaces, and surfaces that have zero volume.

The make colliders checkbox 422 provides an option to convert the simulated instances into a collider for a next round of simulation. The associated freeze button, when pressed, causes the instances to be removed from the simulation. After the user scrubs the simulation to a desired frame, the user presses the freeze button to remove and store the instances as shown in the current frame. If the make colliders checkbox 422 is checked when the freeze button is pressed, then the instances are stored as a collider for a subsequent simulation. If the make colliders checkbox 422 is not checked when the freeze button is pressed, then the instances are not stored as a collider for a subsequent simulation. The user may iterate the populate, simulate, and freeze operations as desired to create multiple layers of scattered instances.

In some embodiments, additional controls (not shown) may be provided to further refine the simulation. For example, a control could be provided to use a subdivided mesh, rather than the control mesh associated with a rigid body or a collider, for the simulation. Simulating with a subdivided mesh could reduce simulation performance with the benefit of more accurate contact calculations among rigid bodies and colliders. In another example, a remesh upper limit could be adjustable by the user. Increasing the remesh upper limit would reduce collision errors during the simulation, while increasing the time needed to remesh. In another example, the user could specify a remesh range, where the size of the triangles on a remeshed surface would fall within the specified range. By adjusting the remesh range, a user could avoid very small and very large triangles on a remeshed surface. In yet another example, could enable the use of a ground plane at a specified height. If the ground plane is enabled, then the instances would be simulated to collide against the ground plane at the specified height. In yet another example, a drag force associated with the instances could be specified to improve the quality of the simulation as the instances are dropped. Specifying such a drag force could increase the time to execute the simulation.

Once the simulated instances are frozen, the instances may be exported to the background scene and optionally used as a collider for a subsequent simulation.

Figure 5:
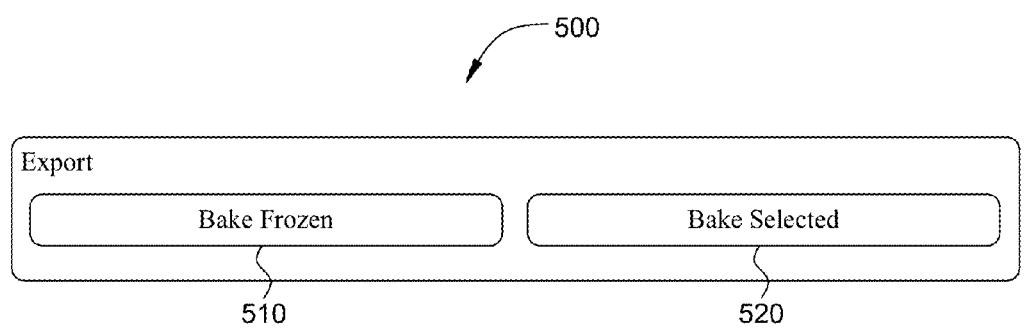
FIG. 5 illustrates a graphical user interface for exporting a collection of simulated bodies to an image scene, according to one embodiment of the invention.

FIG. 5 illustrates a graphical user interface 500 for exporting a collection of simulated bodies to an image scene, according to one embodiment of the invention. As shown, the graphical user interface 500 includes a bake selected button 510 and a bake frozen button 520.

The bake frozen button 510 exports the frozen instances to the background scene, a process known herein as "baking" the instances. When instances are baked, copies of the original rigid bodies are rendered to the populated and simulated instances. If the instances include articulated proxies, further described herein, then baking includes generating the final geometry for the object associated with the articulate proxy. Pressing the bake frozen button 510 causes all frozen instances to be baked.

The bake selected button 520 operates substantially the same as the bake frozen button 510, except that only a subset of selected frozen objects are baked.

Figure 6:
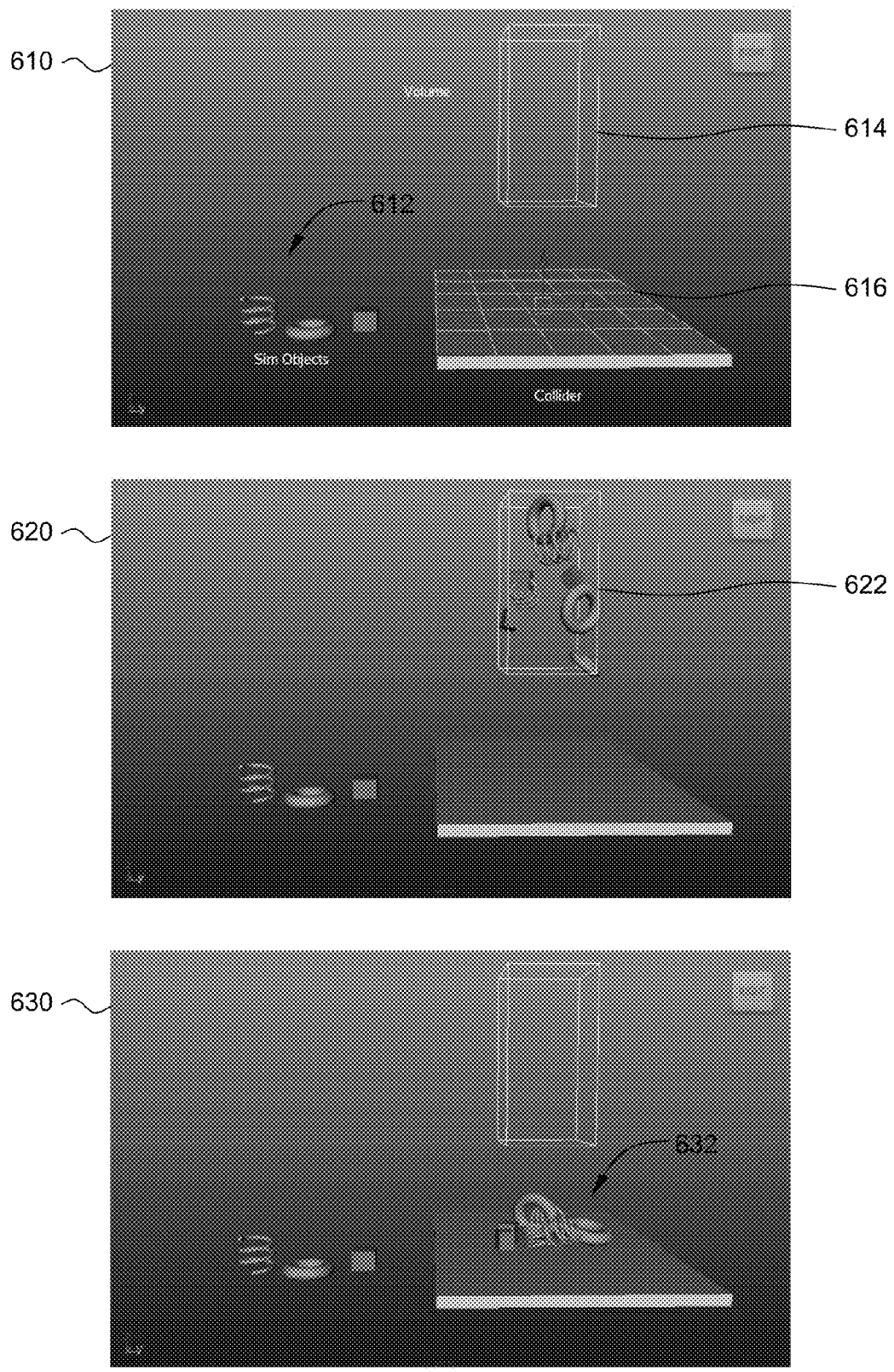
FIG. 6 illustrates a series of rendered images showing a simulated collection of rigid bodies, according to one embodiment of the invention.

FIG. 6 illustrates a series of rendered images 600 showing a simulated collection of rigid bodies, according to one embodiment of the invention. As shown, the series of rendered images 600 includes a pre-placement image 610, a post-placement image 620, and a post-simulation image 630.

The pre-placement image 610 includes a set of reference rigid bodies 612, a placement volume 614, and a collider 616. The reference rigid bodies 612 include the reference objects that are selected to populate the placement volume 614. As shown, the reference rigid bodies 612 include a spring, a toroid, and a cube, although any quantity and type of reference rigid bodies may be specified. The reference rigid bodies 612 themselves are not simulated. The placement volume 614 is the volume where instances of the reference rigid bodies 612 are placed. The placement volume 614 is an example of a volume scatterer, described herein. The collider 616 is a surface that blocks motion of the instances as the instances contact the collider 616. The collider may represent a floor, section of ground, or other suitable object where instances of the reference rigid bodies 612 are to be scattered.

The post-placement image 620 includes placed instances 622 of the reference rigid bodies 612. The placement volume 614 is stochastically sampled, and placed instances 622 populate the placement volume 614 at the sample locations. As shown, the placed instances 622 include various instances of the three reference rigid bodies 612.

The post-simulation image 630 includes simulated instances 632. As the simulation executes, the placed instances 622 are "dropped," and the motion of the placed instances 622 is simulated using gravitational and other forces applied to the placed instances 622. The simulation executes until the placed instances 622 arrive at their final resting positions, as shown by the simulated instances 632. The simulated instances 632 may be frozen and then exported, or baked. The simulated instances 632 may optionally be specified as colliders for a subsequent simulation.

Figure 7:
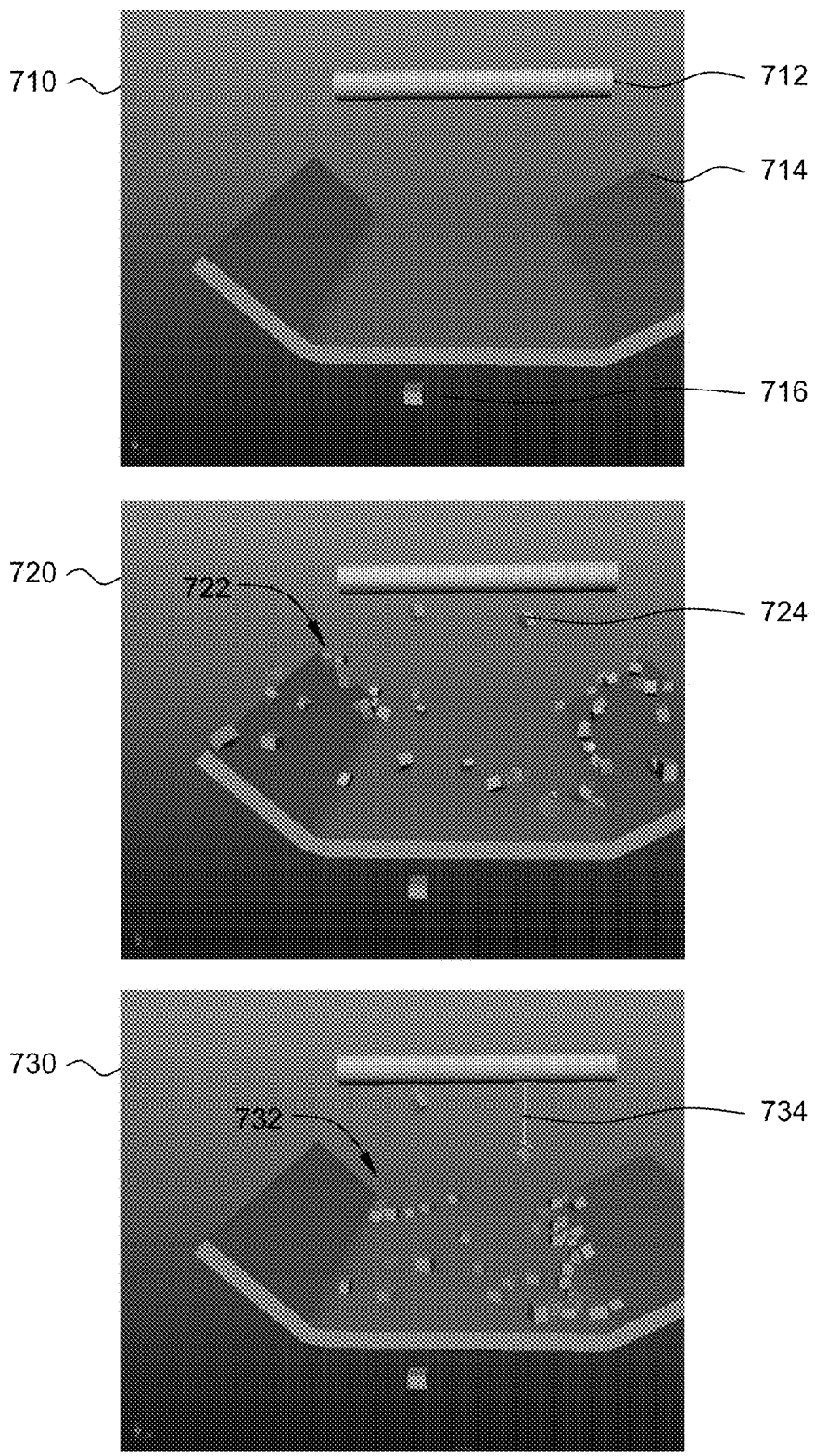
FIG. 7 illustrates a series of rendered images showing a simulated collection of rigid bodies, according to another embodiment of the invention.

FIG. 7 illustrates a series of rendered images 700 showing a simulated collection of rigid bodies, according to another embodiment of the invention. As shown, the series of rendered images 700 includes a pre-placement image 710, a post-placement image 720, and a post-simulation image 730.

The pre-placement image 710 includes a constraining surface 712, an offset scatterer 714, and a reference rigid body 716. The constraining surface 712 is a collider, shown here as a cylindrical rod, to which one or more instances are attached using constraints or springs. The offset scatterer 714 is a flat surface around which instances of the reference rigid body 716 are placed. Here, the offset scatterer 714 also functions as a collider. The reference rigid body 716 functions substantially the same as the set of reference rigid bodies 612 described in conjunction with FIG. 6. In this example, a single cube-shaped reference rigid body 716 is shown, although any quantity and type of reference rigid bodies may be specified.

To identify the reference rigid body 716 as a rigid object, a user selects the offset reference rigid body 716 and then selects "add selected" in the rigid object window 220 of graphical user interface 200. To identify the constraining surface 712 as a collider, a user selects the constraining surface 712 and then selects "add selected" in the collider window 230 of graphical user interface 200. To identify the offset scatterer 714 as a collider, a user selects the offset scatterer 714 and then selects "add selected" in the collider window 230 of graphical user interface 200. To identify the offset scatterer 714 as also a scatterer, a user selects the offset scatterer 714 and then selects "add selected" in the scatterers window 240 of graphical user interface 200.

The post-placement image 720 includes a set of placed instances 722 and a constrained instance 724. When the (re) populate button 360 of graphical user interface 300 is pressed, the offset scatterer 714 is stochastically sampled, resulting in a set of positions on the surface of the offset scatterer 714. These positions are then projected to a random height at a distance above the offset scatterer. The placed instances 722 populate the projected positions. As shown, the placed instances 722 include various instances of the reference rigid body 716. Two objects, including the constrained instance 724, are placed near the constraining surface 712 for attachment via constraints or springs.

The post-simulation image 730 a set of simulated instances 732 and an attachment 734. The set of simulated instances 732 illustrates the final resting places for the placed instances 722 after the simulation completes. As the simulation executes, the placed instances 722 are "dropped," and the motion of the placed instances 722 is simulated using gravitational and other forces applied to the placed instances 722. The simulation executes until the placed instances 722 arrive at their final resting positions, as shown by the simulated instances 732. The simulated instances 732 may be frozen and then exported, or baked. The simulated instances 732 may optionally be specified as colliders for a subsequent simulation The attachment 734 attaches the constrained instance 724 to the constraining surface 712. In general, attachments 734 connect instances, colliders, and components in a scene together in various arrangements. For example, an attachment could be used, without limitation, to connect one instance to another instance, to connect an instance to a collider, or to connect a frozen instance to a component in the scene. The attachment 734 may be, for example, a constraint or a spring.

A constraint models a deformable attachment of fixed length, such as a length of string. To create a constraint, a user selects a first object, such as the reference rigid body 716, and a second object, such as the constraining surface 712. The user then presses a create constraint button (not shown). A constraint is created, connecting the first object and the second object. The user may manually adjust the attachment point of the constraint at either or both ends of the constraint.

A spring models a deformable attachment of variable length, such as a spring. To create a spring, a user selects a first object, such as the reference rigid body 716, and a second object, such as the constraining surface 712. The user then presses a create spring button (not shown). A spring is created, connecting the first object and the second object. The user may manually adjust the attachment point of the spring at either or both ends of the spring. The stiffness and rest length of the spring may be adjusted to vary the motion of the spring during simulation.

Figure 8:
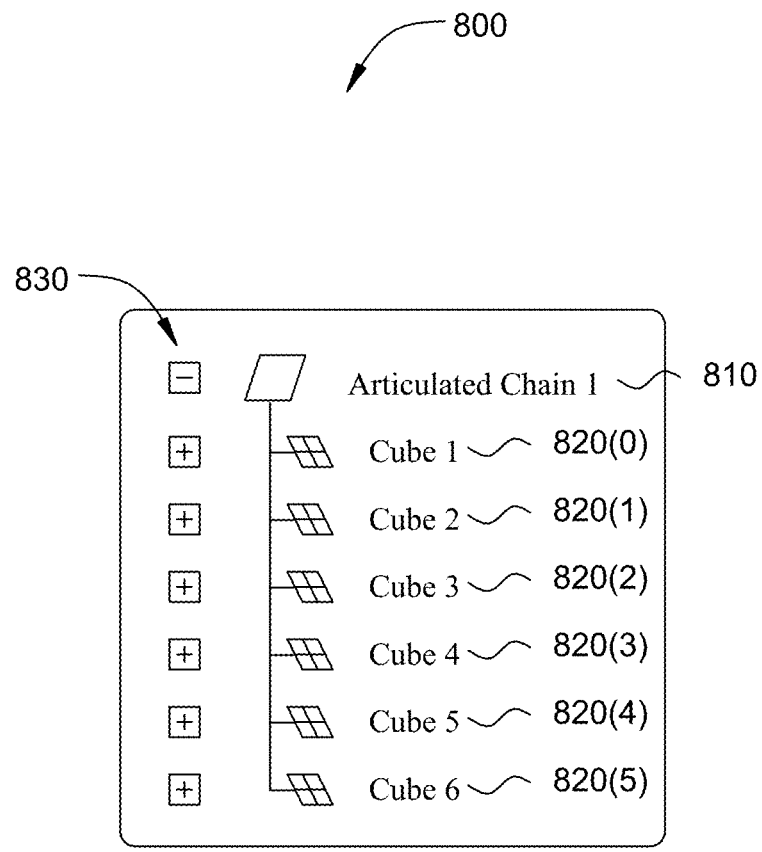
FIG. 8 illustrates an object hierarchy forming an articulated object, according to one embodiment of the invention.

FIG. 8 illustrates an object hierarchy 800 forming an articulated object, according to one embodiment of the invention. As shown, the object hierarchy 800 includes an object root 810 and a set of object components 820(0)-820(5).

The object root node 810 shows the top level of a model associated with an articulated object, as further described below.

The set of object component nodes 820(0)-820(5) are the rigid bodies that compose the articulated object. As shown, the object root node 810 of the articulated object includes six object components, although an articulated object may include any quantity of object components.

An articulated object is an object that includes multiples parts, where each part is a rigid body, as described herein. For example, an articulated object could be used to represent a metal chain. The object component nodes 820 of an articulated object move independently from each other. These object component nodes 820 may be attached together using constraints or springs.

Each object component node 820 may include an independent sub-hierarchy of the articulated object hierarchy, so each object component node 820 may, in turn, be an object root node of another articulated object at a lower level.

An articulated proxy is a special case of an articulated object that is used to model deformable objects, such as rope, where the bending of the deformable object may be approximated by using a sequence of rigid bodies. An articulated proxy simulates in the same fashion as a regular articulated object. However, an articulated proxy may be automatically generated from parametric data associated with the original deformable object, such as a specification of a curve defining a rope-like object. From this parametric data, an articulated object may be automatically created, including the rigid bodies composing the articulated proxy and the constraints or springs that connected the rigid bodies. Although other approaches, such as finite-element models, may produce higher quality motion of deformable objects, articulated proxies produces high quality resting states at reduced simulation times.

As shown, expand/collapse buttons 830 provide a control for a user to expand (+) an object root node 810 or an object component node 820 to show more detail or to collapse (−) an object root 810 node or an object component node 820 to show less detail.

Figure 9:
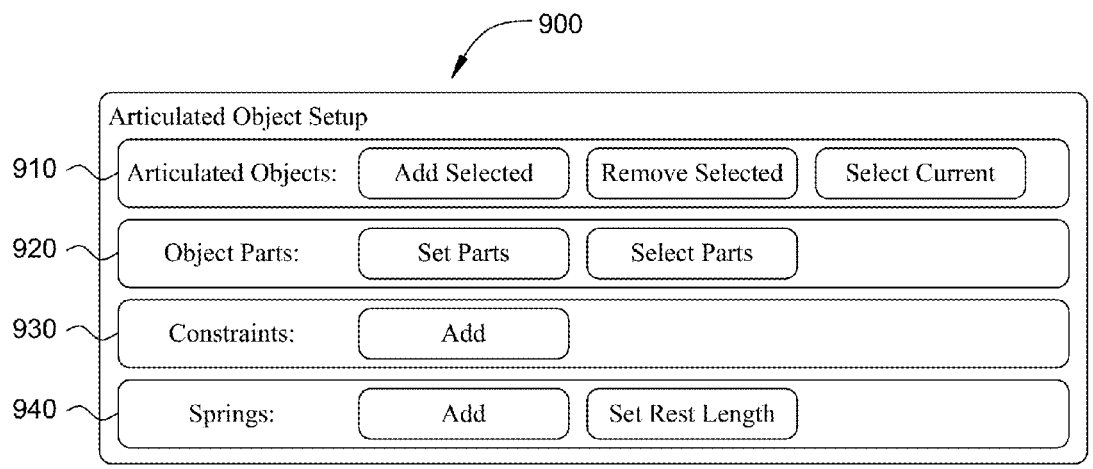
FIG. 9 illustrates a graphical user interface for configuring an articulated object, according to one embodiment of the invention.

FIG. 9 illustrates a graphical user interface 900 for configuring an articulated object, according to one embodiment of the invention. As shown, the graphical user interface 900 includes an articulated object window 910, an object parts window 920, a constraints window 930, and a springs window 940.

The articulated object window 910 includes button controls for selecting a current articulated object for editing and for adding and removing the selected articulated object from the simulation. To select an articulated object, a user first selects the object root node 810 and then presses the select current button in the articulated object window 910. The articulated objects may be previously created and stored in an object library. The selected articulated objects are not simulated. Rather, the selected articulated objects are representative objects that are replicated to produce instances, and the instances are then simulated.

The object parts window 920 includes button controls to select components of an articulated object. To view the current components of an articulated object, a user selects the object root node 810 of the articulated object and then presses the select parts button in the object parts window 920. To change the current components of an articulated object, a user selects additional nodes to add to the articulated object and then presses the set parts button in the object parts window 920.

The constraints window 930 includes button controls to add constraints to an articulated object. To add a constraint, a user selects two object component nodes 820 of the articulated object and then presses the add button in the constraints window 930. The user may manually adjust the attachment point of the constraint at either or both ends of the constraint. In some embodiments, the user may adjust the length of the constraint.

The springs window 940 includes button controls to add springs to an articulated object. To add a spring, a user selects two object component nodes 820 of the articulated object and then presses the add button in the springs window 940. The user may manually adjust the attachment point of the spring at either or both ends of the constraint. The user may set the rest length of the spring by pressing the set rest length button in the springs window 940 and then entering the new rest length. In some embodiments, the user may adjust the stiffness of the constraint.

FIGS. 10A-10D illustrate a series of rendered images showing a simulated collection of articulated objects, according to one embodiment of the invention.

Figures 10A, 10B:
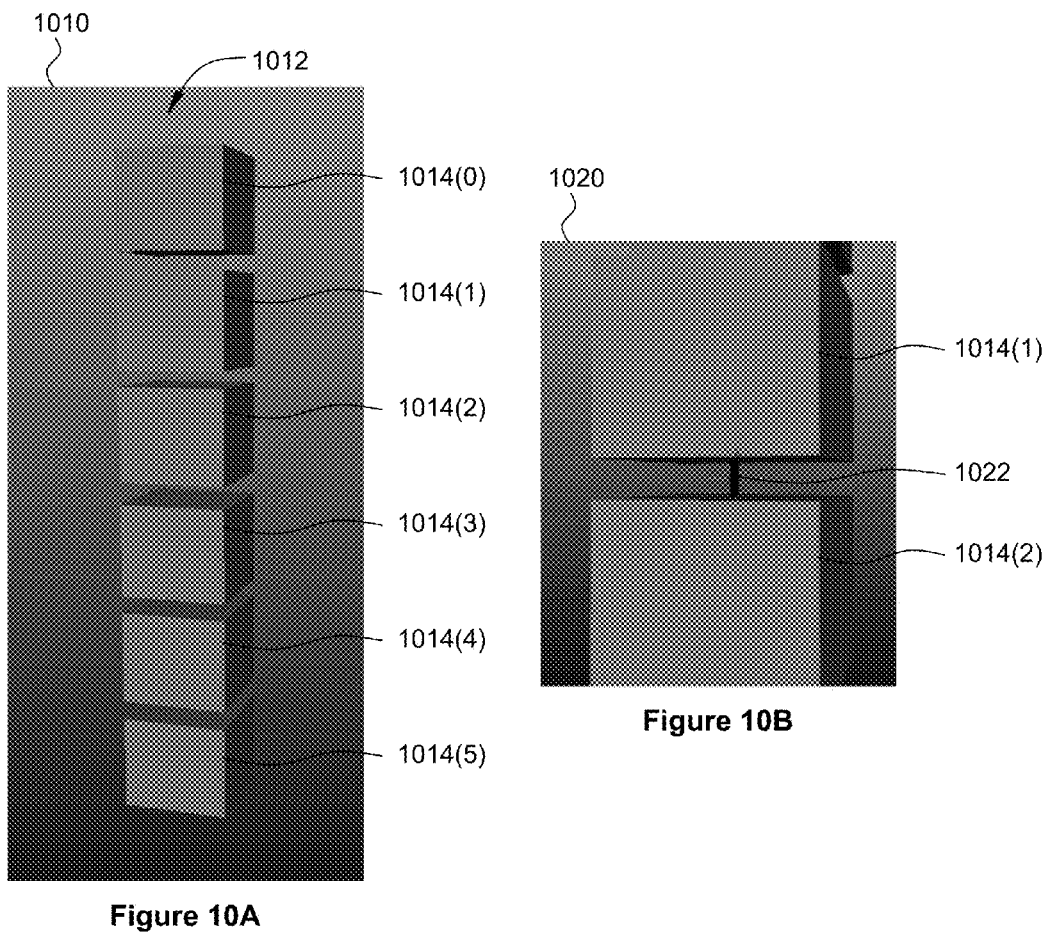
FIGS. 10A-10D illustrate a series of rendered images showing a simulated collection of articulated objects, according to one embodiment of the invention.

FIG. 10A illustrates a rendered image 1010 including an articulated object 1012 made up of a set of individual rigid bodies 1014(0)-1014(5). As shown, the articulated object 1012 includes six individual rigid bodies 1014(0)-1014(5), although an articulated object 1012 may have any quantity of individual rigid bodies 1014.

FIG. 10B illustrates a rendered image 1020 including a detail showing two of the individual rigid bodies 1014(1)-1014(2) for the articulated object 1012 along with an attachment 1022. The attachment 1022 may be a constraint or a spring. The attachment points and the parameters of the spring may be manually adjusted as described above.

Figure 10C:
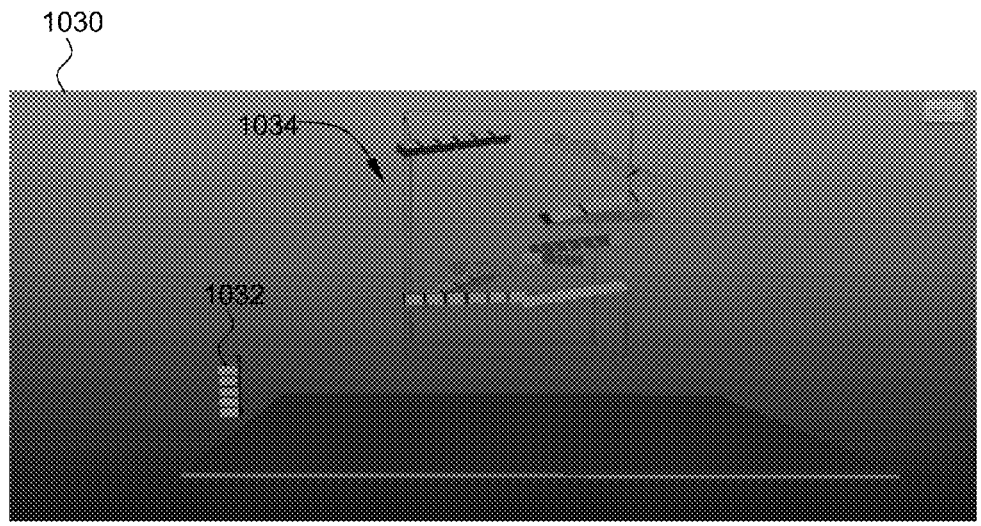

FIG. 10C illustrates a rendered image 1030 after the articulated objects are placed. As shown, the rendered image 1030 includes a reference articulated object 1032 and placed articulated objects 1034. The reference articulated object 1032 shows the reference object that is replicated into instances. The placed articulated objects 1034 include the instances of the reference articulated object 1032 as placed in the placement volume.

Figure 10D:
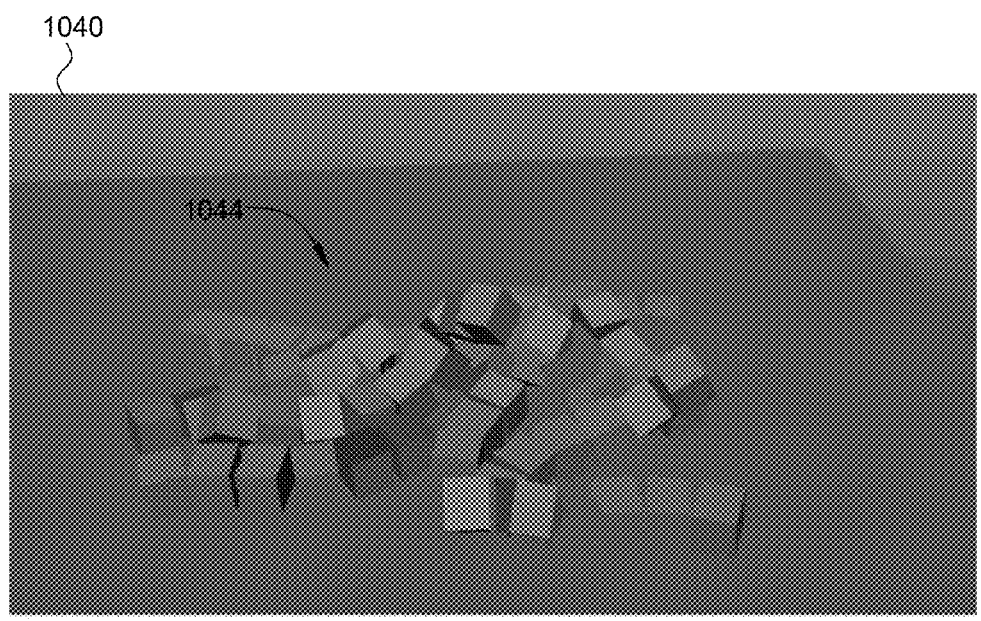

FIG. 10D illustrates a rendered image 1040 after the articulated objects are simulated. As shown, the rendered image 1040 includes simulated articulated objects 1044. The simulated articulated objects 1044 shows the placement of the instances after the simulation executes and the simulated articulated objects 1044 have reached a final resting position on the surface of the collider.

Figure 11:
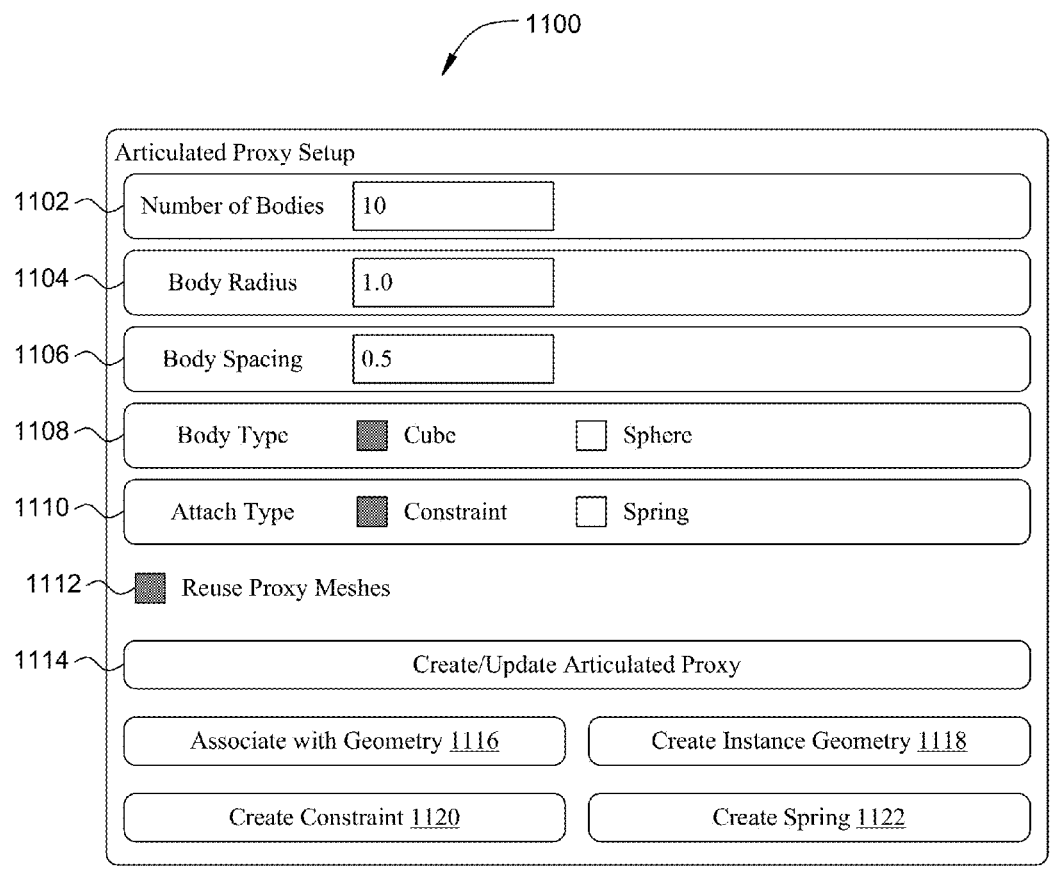
FIG. 11 illustrates a graphical user interface for configuring an articulated proxy, according to one embodiment of the invention.

FIG. 11 illustrates a graphical user interface 1100 for configuring an articulated proxy, according to one embodiment of the invention. As shown, the graphical user interface 1100 includes a number of bodies window 1102, a body radius window 1104, a body spacing window 1106, a body type window 1108, an attach type window 1110, a reuse proxy meshes checkbox 1112, a create/update articulated proxy button 1114, an associate with geometry button 1116, a create instance geometry button 1118, a create constraint button 1120, and a create spring button 1122.

To scatter deformable objects using articulated proxies, a deformable object is first modeled as an articulated object, called an articulated proxy. The articulated proxy is then replicated into instances that populate a scatterer. A simulation is executed, and the resulting instances are frozen and baked. Multiple iterations may be simulated to produce layers of articulated proxies. Geometry for the deformable objects is associated with the simulated articulated proxies. The geometry is used to render the articulated proxies into instances of the deformable object. The instances of the deformable object are then exported.

The number of bodies window 1102 includes a field for a user to select the number of bodies included in the articulated proxy. As shown, the number of bodies window 1102 specifies that the articulated proxy includes 10 bodies.

The body radius window 1104 includes a field for a user to select the radius of the bodies included in the articulated proxy. The radius determines the thickness of the deformable object. As shown, the body radius window 1104 specifies that the bodies included in the articulated proxy have a radius of 1.0 units. The units may be any desired unit of measure, such as centimeters. In general, the body radius is selected to approximate the thickness of the final deformable object, although any suitable radius may be selected. If the selected radius is too large, then the final geometry may exhibit empty space along the length of the deformable object. If the selected radius is too small, then the final geometry may exhibit overlap along the length of the deformable object.

The body spacing window 1106 includes a field for a user to select the spacing between adjacent bodies included in the articulated proxy. The spacing determines the accuracy and the flexibility of the deformable object. As shown, the body spacing window 1106 specifies that the bodies included in the articulated proxy have a spacing of 0.5 units. The units may be any desired unit of measure, such as centimeters The body type window 1108 includes check boxes for various shape types for the bodies included in the articulated proxy. As shown, the available body types include cube and sphere, with cube being the selected body type. In general, cubes are more resistance to bending, while spheres may be more stable during simulation, particularly for large or complex simulations. Although only cubes and spheres are shown, any technically feasible body type may be used.

The attach type window 1110 includes check boxes for various attachment types for the bodies included in the articulated proxy. As shown, the available attachment types include constraint and spring, with constraint being the selected attachment type. Constraints and springs operate substantially the same as describe above in conjunction with FIGS. 7 and 9.

The reuse proxy meshes checkbox 1112 provides an option to use only one cube or sphere mesh for all bodies of all instances of the articulated proxies in the simulation. If the reuse proxy meshes checkbox 1112 is checked, then one cube or sphere mesh is used for all instances. Performance may be improved where one cube or sphere mesh is used for all instances. If the reuse proxy meshes checkbox 1112 is not checked, then a user may manually specify different cube or sphere meshes for different bodies within one or more instances of the articulated proxy. In this latter case, simulation performance may be reduced.

The create/update articulated proxy button 1114, when pressed, causes an articulated proxy to be created or updated. Once an articulated proxy is created, the parameters described above may be adjusted, and the articulated proxy may be updated multiple times until a desired articulated proxy is produced. After the articulated proxy is created, a scene is populated with instances, the instances are simulated and then frozen, and the process may be repeated multiple times to create layers of articulated proxies. The articulated proxies are then associated with the geometry defining the surface of the deformable objects.

The associate with geometry button 1116, when pressed, associates an articulated object when geometry that defines the surface of the deformable object. To associate with geometry, a user first selects an articulated proxy that has been created as described above. The user then selects geometry associated with the articulated proxy. The geometry may be retrieved from an object library. The user then presses the associate with geometry button 1116 to link the articulated proxy to the geometry.

The create instance geometry button 1118, when pressed, applies the geometry for a deformable object to the instances of the articulated proxies. If the create instance geometry button 1118 after the simulation executes, then the geometry is applied to the instances as positioned in the respective final resting positions. If the create instance geometry button 1118 before the simulation executes, then the geometry is applied to the instances as positioned in the respective initial positions. In this latter case, the simulation is performed on the deformable objects, as rendered with geometry, rather than with the articulated proxies. As a result, a user may view the deformable objects during simulation, producing a more realistic view of the final rendered image. However, simulation performance may be reduced when simulating deformable objects with associated geometry rather than simulating articulated proxies.

The create constraint button 1120 and the create spring button 1122 function substantially as described in conjunction with FIGS. 7 and 9.

FIGS. 12A-12D illustrate a series of rendered images showing a simulated collection of articulated proxies, according to one embodiment of the invention.

Figure 12A:
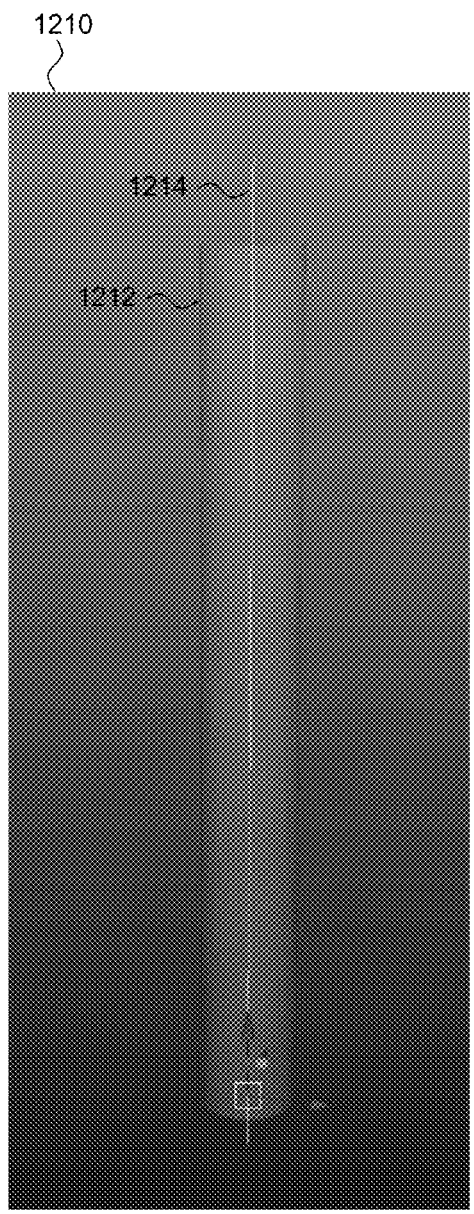
FIGS. 12A-12D illustrate a series of rendered images showing a simulated collection of articulated proxies, according to one embodiment of the invention.

FIG. 12A illustrates a rendered image 1210 including an object 1212 to be simulated. As shown, the object 1212 is cylindrical volume that is deformable. The object 1212 includes a curve 1214 that follows the center of the object 1212.

Figure 12B:
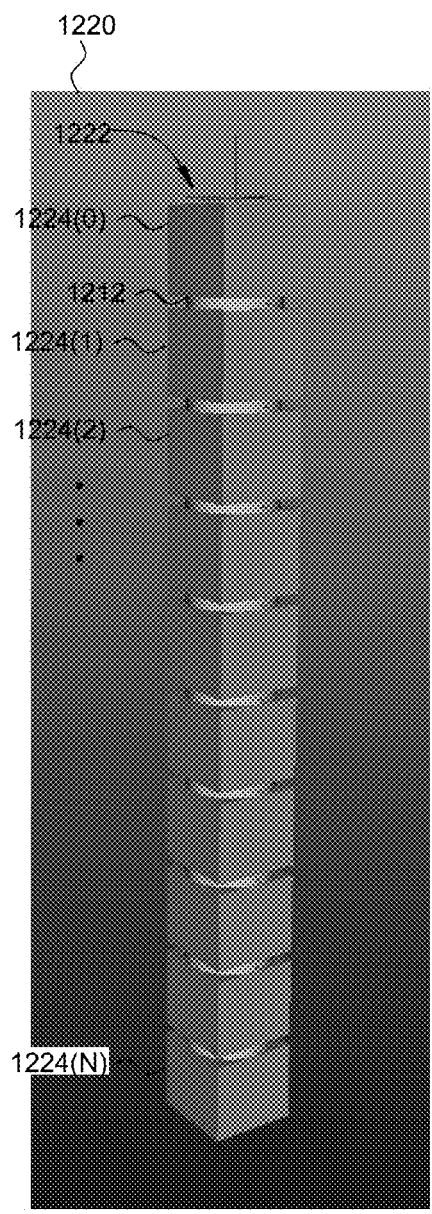

FIG. 12B illustrates a rendered image 1220 including an articulated proxy 1222 of the object 1212. As shown, the articulated proxy 1222 includes individual rigid bodies 1224(0)-1224(N) that compose the articulated proxy 1222. The individual rigid bodies 1224(0) are distributed along the length of the object 1212.

Figure 12C:
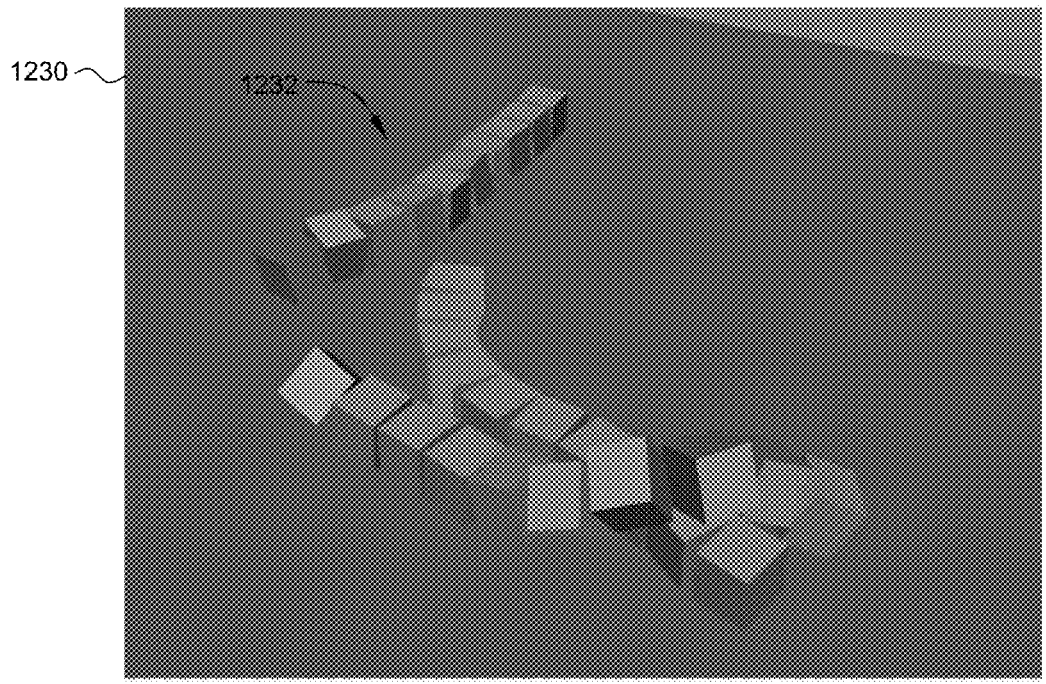

FIG. 12C illustrates a rendered image 1230 after the articulated proxies are placed and simulated. As shown, the rendered image 1230 includes a simulated articulated proxies 1232. The simulated articulated objects 1232 shows the placement of the instances after the instances are placed, the simulation executes, and the simulated articulated proxies 1232 have reached a final resting position on the surface of the collider.

Figure 12D:
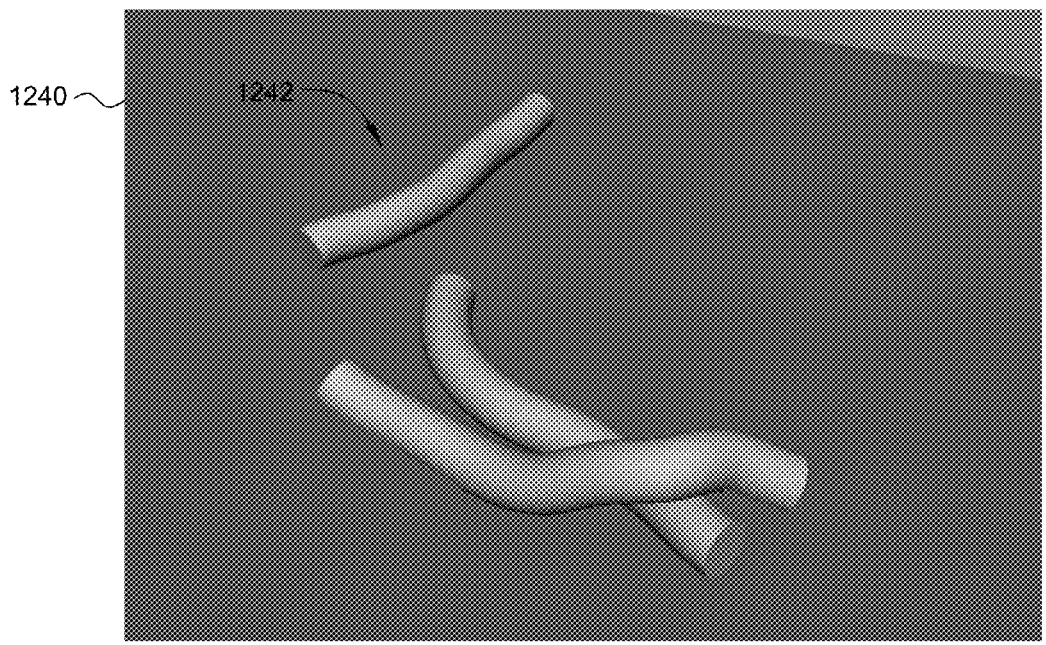

FIG. 12D illustrates a rendered image 1230 after the simulated articulated proxies 1232 are rendered into final form as rendered objects 1242.

Figure 13:
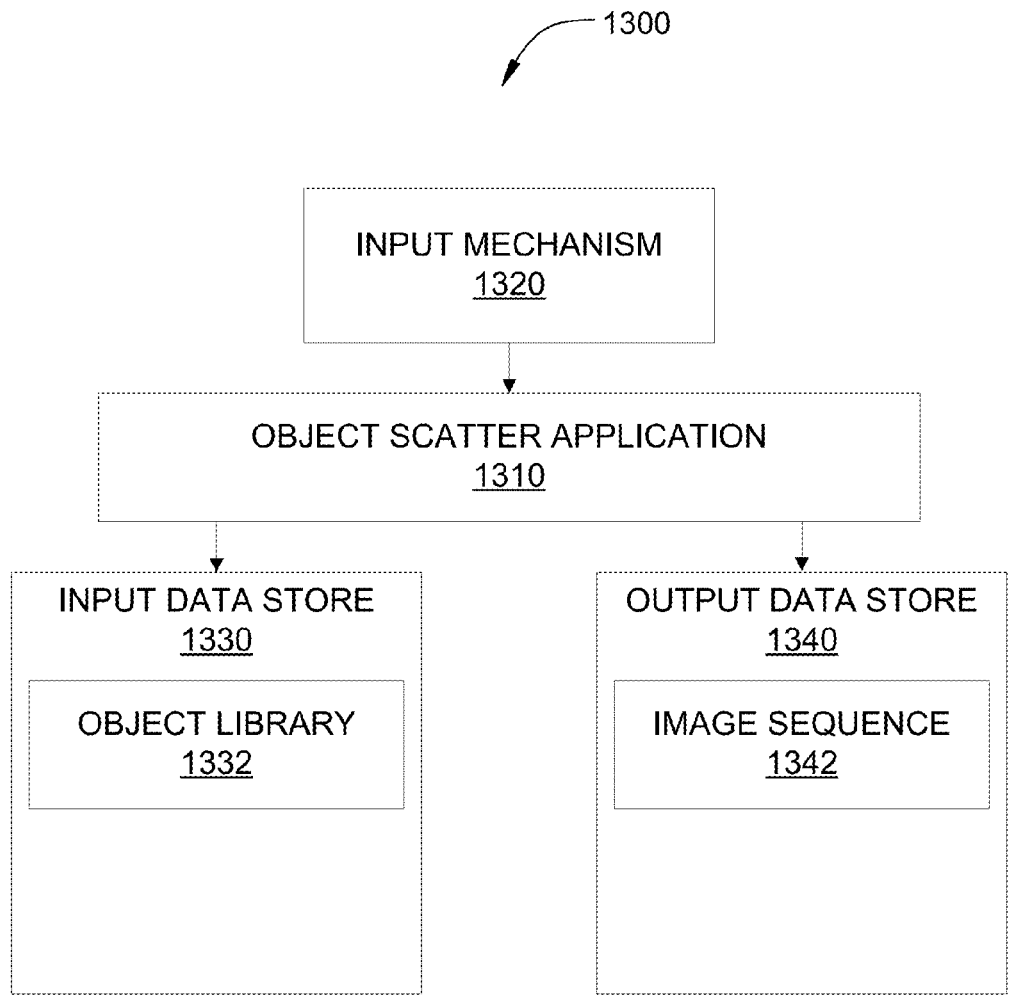
FIG. 13 illustrates an object scattering system as may be implemented on the computing system of FIG. 1, according to one embodiment of the invention.

FIG. 13 illustrates an object scattering system 1300 as may be implemented on the computing system of FIG. 1, according to one embodiment of the invention. As shown, the object scattering system 1300 includes an object scattering application 1310, an input mechanism 1320, an input data store 1330, and an output data store 1340.

The object scattering application 1310 is a software program including instructions that, when executed, performs the techniques described above in conjunction with FIGS. 2-12. The object scattering application 1310 may reside in system memory 104 where the instructions of the software program may be retrieved and executed by the CPU 102.

The input mechanism 1320 receives one or more input variables, such as a description including one or more graphics objects and parameters defining scattering of the objects, as described herein, and transmits the one or more input variables to the object scattering application 1310. For example, the input mechanism 1320 could receive a definition of a group rigid bodies, articulated objects, or articulated bodies, along with parameters for populating a volume with the objects and simulating motion of the objects. The input mechanism 1320 may provide data to the object scattering application 1310 via one or more input devices 108 in conjunction with the graphical user interface 200 300 400 500 900 1100.

The input data store 1330 provides input data to the object scattering application 1310. As shown, the input data store 1330 includes an object library 1332. The object library 1332 includes descriptions of objects for scattering by the object scattering application 1310. For example, the object library 1332 could include a first set of rigid bodies, where one or more of the rigid bodies would be replicated, sized, and placed in a volume prior to simulating a motion response, such as due to gravity or spring resistance, of the rigid bodies. The object library 1332 could also include a second set of articulated bodies, where one or more of the articulated bodies would be replicated, sized, and placed in a volume prior to simulating a motion response, such as due to gravity, of the articulated bodies. The object library 1332 could also include a third set of articulated proxies, where one or more of the articulated proxies would be replicated, sized, and placed in a volume prior to simulating a motion response, such as due to gravity, of the articulated proxies.

The input data store 1330 may also include any other input information for the object scattering application 1310 including, without limitation, previously simulated object sets (not shown). The input data store 1330 may be located within the system disk 114.

The output data store 1340 provides output data from the object scattering application 1310 for storage or display. As shown, the output data store 1340 includes an image sequence 1342.

The image sequence 1342 includes a series of image frames produced by the object scattering application 1310, where each image frame includes a rendered image showing the objects as placed, scattered, and simulated by the object scattering application 1310. The image frames in the image sequence 1342 may be displayed on the display device 110 to view the crowd of characters in motion over time.

The output data store 1340 may also include any other output information for the object scattering application 1310 including, without limitation, a copy of the currently loaded object set description (not shown). The output data store 1340 may be located within the system disk 114. Alternatively, the output data store 1340 may be located within a memory in a format suitable for display on the display device 110.

Figure 14:
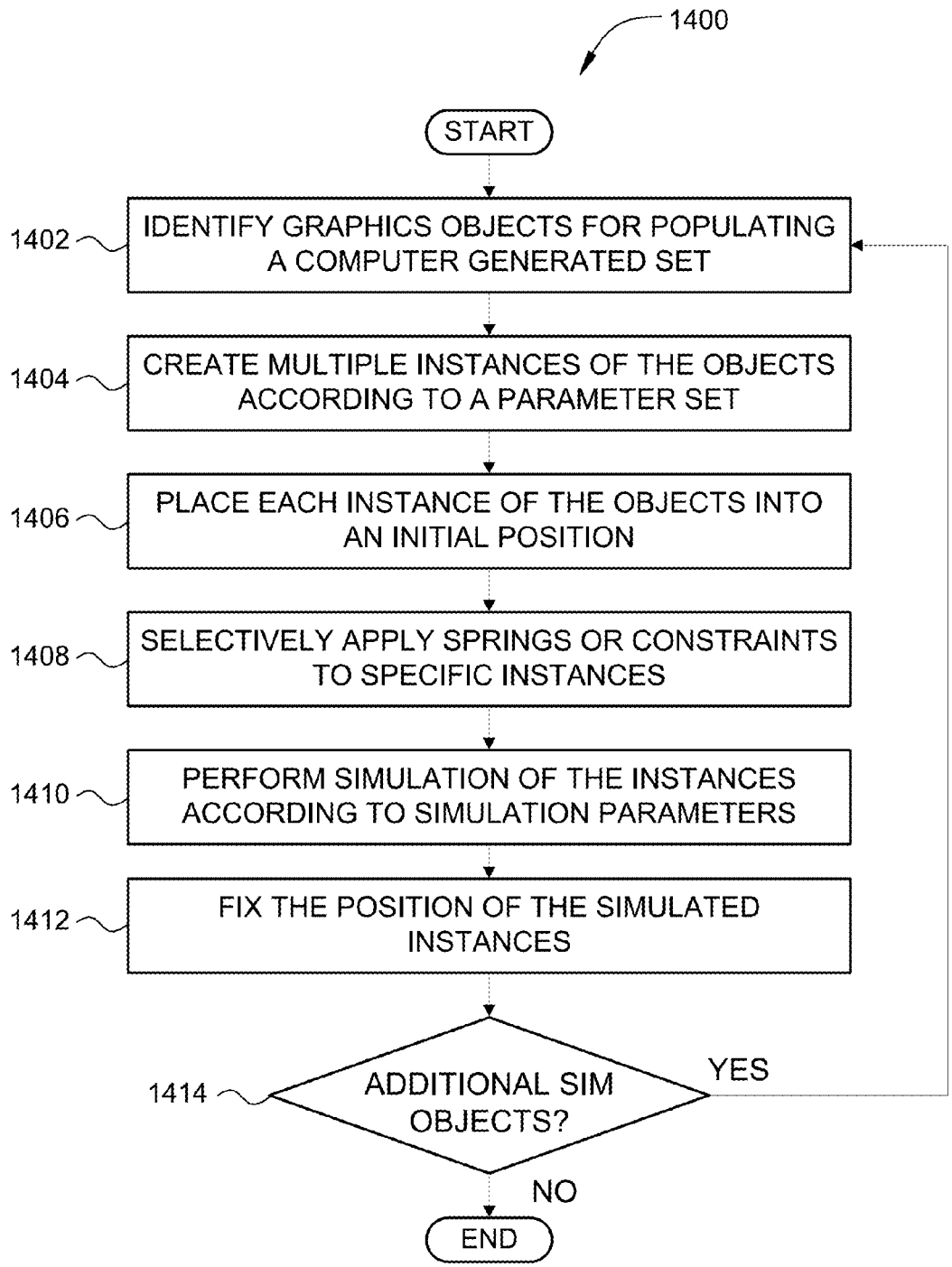
FIG. 14 sets forth a flow diagram of method steps for configuring and simulating a collection of scatter objects with the system of FIG. 13, according to one embodiment of the invention.

FIG. 14 sets forth a flow diagram of method steps for configuring and simulating a collection of scatter objects with the system of FIG. 13, according to one embodiment of the invention. Although the method steps are described in conjunction with the systems of FIGS. 1 and 13, persons skilled in the art will understand that any system configured to perform the method steps, in any order, falls within the scope of the present invention.

A method 1400 begins at step 1402, where the object scatter application 1310 identifies graphics objects for populating a computer generated set. At step 1404, the object scatter application 1310 creates multiple instances of the objects according to a parameter set. The parameter set may be defined by a user via one or more graphical user interfaces 200 300 400 500 900 1100 associated with the object scatter application 1310. At step 1406, the object scatter application 1310 places each instance of the objects into an initial position. At step 1408, the object scatter application 1310 selectively applies springs or constraints on specific instances of the objects. At step 1410, the object scatter application 1310 performs a simulation of the instances of the objects according to one or more simulation parameters. At step 1412, the object scatter application 1310 fixes the position of the simulated instances. At step 1414, the object scatter application 1310 determines whether additional objects remain to be simulated. If there additional objects remain to be simulated, then the method 1400 proceeds to step 1402, described above. If at step 1414, however, no additional objects remain to be simulated, then the method 1400 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In sum, a set dressing tool is disclosed which allows a user to populate a volume with a number of objects, optionally attach certain objects to a non-moving body using constraints or springs, and simulate dropping the objects. The placed objects may be individual rigid bodies. Alternatively, the placed objects may articulated objects that include individual rigid bodies that are attached to each other using constraints or springs. Alternatively, the placed objects may be articulated proxies that approximate deformable rope-like objects using articulated rigid bodies. Simulation parameters may be chosen to reduce the number of simulation steps while still resulting in a believable final position for the dropped objects, while appropriately resolving collisions among the objects. After a set of objects has been simulated, the objects may be "frozen" in place and exported from the simulator. Once frozen, the set of objects may be classified as an additional collider for subsequent object simulations, giving the ability to layer new objects over previously simulated objects.

While the foregoing is directed to embodiments of the present invention, other and further embodiments of the invention may be devised without departing from the basic scope thereof, and the scope thereof is determined by the claims that follow.

What is claimed is:

1. A computer-implemented method of populating a static model with graphics objects, the computer-implemented method comprising:
   identifying a first graphics object that is associated with the static model;
   creating a first plurality of graphics objects where each graphics object in the first plurality of graphics objects comprises an instance of the first graphics object;
   placing each graphics object in the first plurality of graphics objects into a respective first position;
   simulating a motion path for each graphics object in the first plurality of graphics objects from their respective first position to a respective second position and by operation of one or more computer processors; and
   adjusting the motion path of a second graphics object in the first plurality of graphics objects, based on an articulation constraint that limits the motion of the second graphics object, whereafter one or more images are rendered based on the first plurality of graphics objects and output.

2. The computer-implemented method of claim 1, wherein intersection between the graphics objects in the first plurality of graphics objects is avoided while simulating the motion path.

3. The computer-implemented method of claim 1, wherein placing each graphics object in the first plurality of graphics objects into a first position comprises:
   sampling a three-dimensional volume that is associated with an affine transformation to create a plurality of sample points; and placing each graphics object in the first plurality of graphics objects at a sample point in the plurality of sample points.

4. The computer-implemented method of claim 1, wherein placing each graphics object in the first plurality of graphics objects into a first position comprises:
   sampling a surface of two-dimensional plane to create a first plurality of sample points; and
   for each sample point in the first plurality of sample points, projecting the sample point to a position orthogonal to the two-dimensional plane and at a distance from the two-dimensional plane.

5. The computer-implemented method of claim 1, wherein simulating the motion path comprises:
   identifying a collision between the second graphics object and a third graphics object, wherein the motion path of the second graphics object is adjusted based on the collision.

6. The computer-implemented method of claim 1, further comprising:
   adjusting the motion path of a third graphics object in the first plurality of graphic objects, based on the articulation constraint, wherein the articulation constraint limits the relative motion of the second graphics object and the third graphics object.

7. The computer-implemented method of claim 6, further comprising:
   identifying a spline curve related to the first plurality of graphics objects;
   wherein at least one of the first position of the second graphics object, the first position of the third graphics object, and a position of the articulation constraint correspond to position on the spline curve.

8. The computer-implemented method of claim 1, further comprising:
   fixing the position of each graphics object in the first plurality of graphics objects to the second position;
   creating a second plurality of graphics objects where each graphics object in the second plurality of graphics objects comprises an instance of the second graphics object;
   placing each graphics object in the second plurality of graphics objects into a respective first position;
   simulating a motion path for each graphics object in the second plurality of graphics objects from their respective first position to a respective second position;
   identifying a collision between a third graphics object in the second plurality of graphics objects and a fourth graphics object in the first plurality of graphics objects; and
   adjusting the motion path of the third graphics object based on the collision with the fourth graphics object.

9. The computer-implemented method of claim 1, further comprising storing an animation file on a computer-readable medium, wherein the animation file comprises the output of the identifying, creating, placing and simulating steps.

10. A non-transitory computer-readable medium including instructions executable to populate a static model with graphics objects, by performing the steps of:
    identifying a first graphics object that is associated with the static model;
    creating a first plurality of graphics objects where each graphics object in the first plurality of graphics objects comprises an instance of the first graphics object;
    placing each graphics object in the first plurality of graphics objects into a respective first position;
    simulating a motion path for each graphics object in the first plurality of graphics objects from their respective first position to a respective second position and by operation of one or more computer processors when executing the instructions; and
    adjusting the motion path of a second graphics object in the first plurality of graphics objects, based on an articulation constraint that limits the motion of the second graphics object, whereafter one or more images are rendered based on the first plurality of graphics objects and output.

11. The non-transitory computer-readable medium of claim 10, wherein intersection between the graphics objects in the first plurality of graphics objects is avoided while simulating the motion path.

12. The non-transitory computer-readable medium of claim 10, wherein placing each graphics object in the first plurality of graphics objects into a first position comprises:
    sampling a three-dimensional volume that is associated with an affine transformation to create a plurality of sample points; and
    placing each graphics object in the first plurality of graphics objects at a sample point in the plurality of sample points.

13. The non-transitory computer-readable medium of claim 10, wherein placing each graphics object in the first plurality of graphics objects into a first position comprises:
    sampling a surface of two-dimensional plane to create a first plurality of sample points;
    for each sample point in the first plurality of sample points, projecting the sample point to a position orthogonal to the two-dimensional plane and at a distance from the two-dimensional plane.

14. The non-transitory computer-readable medium of claim 10, wherein simulating the motion path comprises:
    identifying a collision between the second graphics object and a third graphics object, wherein the motion path of the second graphics object is adjusted based on the collision.

15. The non-transitory computer-readable medium of claim 10, further comprising the step of:
    adjusting the motion path of a third graphics object in the first plurality of graphics objects, based on the articulation constraint, wherein the articulation constraint limits the relative motion of the second graphics object and the third graphics object.

16. The non-transitory computer-readable medium of claim 15, further comprising the steps of:
    identifying a spline curve related to the first plurality of graphics objects;
    wherein at least one of the first position of the second graphics object, the first position of the third graphics object, and a position of the articulation constraint correspond to position on the spline curve.

17. The non-transitory computer-readable medium of claim 10, further comprising the steps of:
    fixing the position of each graphics object in the first plurality of graphics objects to the second position;
    creating a second plurality of graphics objects where each graphics object in the second plurality of graphics objects comprises an instance of the second graphics object;
    placing each graphics object in the second plurality of graphics objects into a respective first position;
    simulating a motion path for each graphics object in the second plurality of graphics objects from their respective first position to a respective second position;

identifying a collision between a third graphics object in the second plurality of graphics objects and a fourth graphics object in the first plurality of graphics objects; and adjusting the motion path of the third graphics object based on the collision with the fourth graphics object.

18. A computing system, comprising:

a memory that is configured to store instructions for a program; and a computer processor including hardware and that is configured to execute the instructions for the program to populate a static model with graphics objects, by performing an operation comprising:

identifying a first graphics object that is associated with the static model;

creating a first plurality of graphics objects where each graphics object in the first plurality of graphics objects comprises an instance of the first graphics object;

placing each graphics object in the first plurality of graphics objects into a respective first position;

simulating a motion path for each graphics object in the first plurality of graphics objects from their respective first position to a respective second position; and adjusting the motion path of a second graphics object in the first plurality of graphics objects, based on an articulation constraint that limits the motion of the second graphics object, whereafter one or more images are rendered based on the first plurality of graphics objects and output.

19. The computing system of claim 18, wherein intersection between the graphics objects in the first plurality of graphics objects is avoided while simulating the motion path.

20. The computing system of claim 18, wherein placing each graphics object in the first plurality of graphics objects into a first position comprises:

sampling a three-dimensional volume that is associated with an affine transformation to create a plurality of sample points; and placing each graphics object in the first plurality of graphics objects at a sample point in the plurality of sample points.

* * * * *